Inventors
Günter Köpke
Alfons Denz
Eckehart Grau
Erwin Strasser

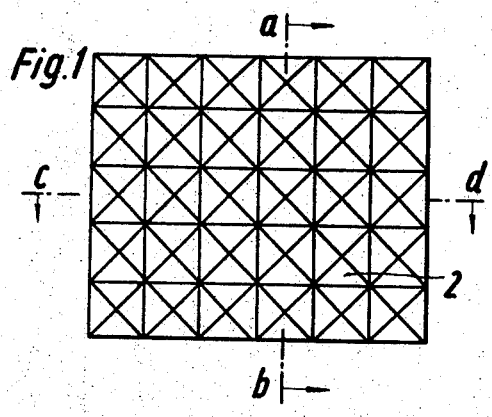
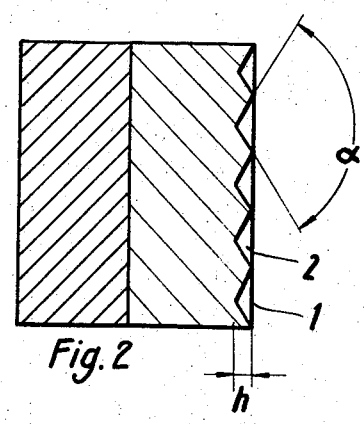
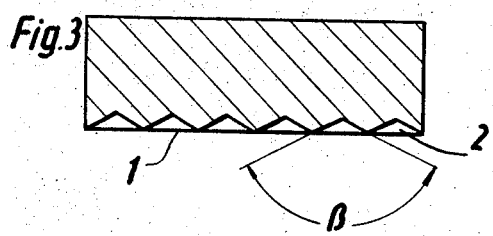
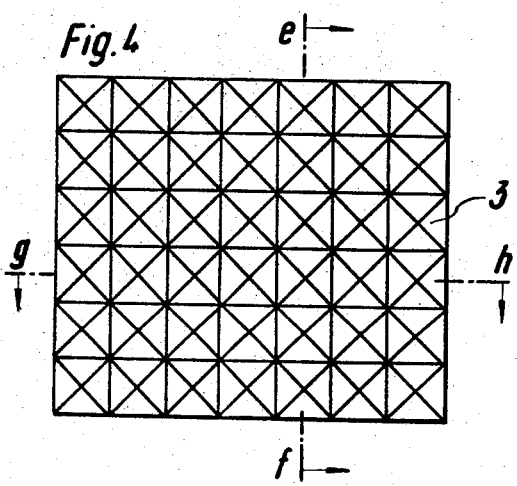
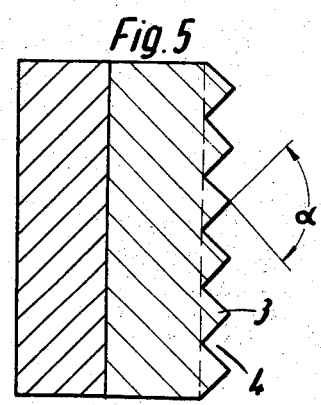
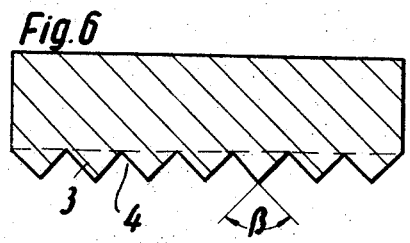
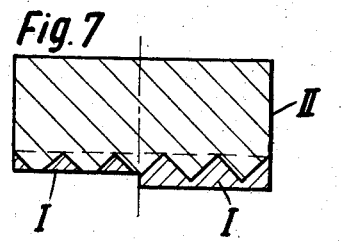

Dec. 8, 1970  G. KÖPKE ET AL  3,545,831
JOURNAL BEARING

Filed Nov. 18, 1968  5 Sheets-Sheet 3

Inventors
Günter Köpke
Alfons Denz
Eckehart Grau
Erwin Strasser

Inventors
Günter Köpke
Alfons Denz
Eckehart Grau
Erwin Strasser

Inventors
Günter Köpke
Alfons Denz
Eckehart Grau
Erwin Strasser 3,545,831
JOURNAL BEARING
Günter Köpke, Heilbronn, Alfons Denz, Neckarsulm, Eckehardt Grau, Marbach, and Erwin Strasser, Heilbronn, Germany, assignors to Karl Schmidt GmbH, Neckarsulm, Germany
Filed Nov. 18, 1968, Ser. No. 784,508
Claims priority, application Germany, Nov. 24, 1967, 1,625,627
Int. Cl. F16c 33/12
U.S. Cl. 308—239        4 Claims

ABSTRACT OF THE DISCLOSURE

A bearing surface-carrying member has a metal surface formed by a material of the class consisting of aluminum and aluminum alloys. Said surface is formed with depressions at least partly filled with low-friction plastics material forming at least part of a bearing surface.

---

It is an object of this invention to provide a journal bearing which requires little or no maintenance and is made from metallic material. Journal bearings which require little or no maintenance and have bearing surfaces consisting mainly of plastics material, such as polytetrafluoroethylene, are already known. Reference is made in this connection, e.g., to German Pat. 962,561, in which it is proposed to incorporate the polytetrafluoroethylene with an addition of metal in a porous, coherent metal structure. The state of the art includes also a journal bearing which requires only little maintenance and in which an acetal resin is rolled into a similar skeleton of sintered bronze. In both embodiments, the known disadvantages of pure plastic materials, such as high thermal expansion, creep, low mechanical strength and limited load-carrying capacity, are reduced, but the dissipation of heat from the bearing interface is not yet optimum. The manufacture of such composite bearings is expensive. Other known metallic journal bearings requiring no maintenance consist of oil-impregnated sintered bearings, but these have also only a limited capacity.

Attempts have been made to loosen up a metallic bearing surface by the incorporation of softer materials so as to improve the sliding properties. For instance, Swiss Pat. No. 206,788 describes and shows a journal bearing which consists of metal and has a supporting shell of a material which has a high high-temperature strength and a high high-temperature creep strength and has corrugations for taking up higher shaft pressures per unit of area. A flow-in composition having a low friction is disposed in these corrugations. Another proposal in the same direction has been disclosed by German Pat. No. 154,626. In that known structure, the bearing shell consists of ferrous alloys or bronze and the pores and irregularities of the bearing surface are filled with relatively soft substances, such as soft metal or synthetic resin. In this field, reference may also be made to the British Pat. No. 683,404, which disclosed a bearing surface, which is formed with intersection grooves filled, e.g., with silver.

None of these previously proposed journal bearings which require little or no maintenance and comprise metallic material has apparently proved satisfactory in practice because the journal bearings of this type which are mainly used consist of plastics materials.

This invention relates to a journal bearing which has a bearing surface of metal which is locally replaced by softer low-friction material. To provide a successful journal bearing which comprises metallic material and requires little or no maintenance, this invention proposes to provide a bearing surface consisting of aluminum or aluminum alloys and formed with depressions, which are filled with low-friction plastic materials. It has surprisingly been found that this combination of low-friction materials disposed one beside the other in the bearing surface is eminently satisfactory in a bearing which requires little or no maintenance so that such bearing can also be used in applications involving higher loads, e.g., as a crankshaft bearing or connecting rod bearing in internal combustion engines. The metallic portion of the bearing surface may be 0 or 5 to 95%, peferably 0 to 5 to 20%, for bearings requiring no maintenance, and 40 to 65% for bearings which require little maintenance. The portion of the plastics material surface can be calculated from the above figures. Tests made with bearings which comply with either of the two requirements stated above have shown that a bearing designed in accordance with this invention provides for optimum conditions as to the dissipation of heat and, consequently, as to friction and wear. Under otherwise identical operating conditions surh a peripheral velocity, mean pressure per unit of area, relative bearing clearance, etc., and equal bearing dimensions, the resulting mean bearing temperatures were much lower than in comparable plastic materials composite bearings of the known type, which have been described heretofore. An important technical advance has thus been achieved. Besides, the bearing according to this invention also affords important economic advantages, which must also be taken as a considerable advance.

Tests have shown that the depressions may have various forms. For instance, they may have the shape of pyramids, sawteeth, cones or parts of a sphere. For use under dynamic loads, these depressions are preferably rounded at the bottom of the notch. Depressions in the shape of parts of a sphere are most desirable. It may also be found desirable to close said depressions in part in a second operation, e.g., by rolling, after the plastic material has been introduced. This will improve the dissipation of heat and the anchoring of the plastics material in the bearing metal. The further depressions which are formed in the bearing surface in this subsequent operation may be desirably filled with a suitable lubricant such as grease or oil when the bearing is to be used so that the life of the bearings will be prolonged.

Practical experiments have shown that particularly for use under higher loads the metallic portion of the bearing surface gives satisfactory results if its metallic portion consists of an aluminum alloy having the following composition:

5–30% tin
and/or
3–15% lead
0–12% silicon
balance aluminum

The plastics materials which may be used within the scope of this invention include all low-friction plastic materials, such as polytetrafluoroethylene, polytetrafluorobenzene, acetal, polyesters, polyimides or polyamides, particularly polyamide 11. To achieve a higher load-carrying capacity, it will be desirable according to this invention to incorporate metallic aluminum, tin, lead, indium, cadmium, thallium and the oxides or other chalcogenides, such as compounds of sulfur, selenium or tellurium; thereof, individually or mixed.

These added metalliferous materials may be incorporated in the depressions, e.g., in the form of balls or irregularly shaped particles in order to improve the dissipation of heat from the bearing clearance and the anchoring of the plastics material. It has also proved satisfactory to provide a bearing member in which the metallic part is secured to a supporting shell of steel by cladding, sintering or other methods. The supporting shell of steel enables a satisfactory force fit and enables the provision of a thin bearing body so as to provide for a higher load-carrying capacity.

The means by which the objects of this invention are obtained are described more fully with reference to the accompanying drawings in which:

FIG. 1 is a top plan view showing a first embodiment;

FIG. 2 is a cross-sectional view taken on line *a–b* in FIG. 1;

FIG. 3 is a cross-sectional view taken on line *c–d* of FIG. 1;

FIG. 4 is a top plan view showing a second embodiment;

FIG. 5 is a cross-sectional view taken on the line *e–f* of FIG. 4;

FIG. 6 is a cross-sectional view taken on line *g–h* of FIG. 4;

FIG. 7 is a cross-sectional view showing two methods of introducing plastics material into the depressions;

Figure 8:
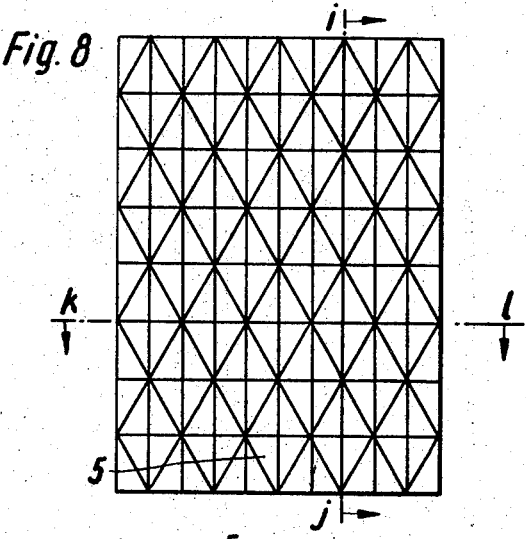
FIG. 8 is a top plan view showing a third embodiment.
Figure 9:
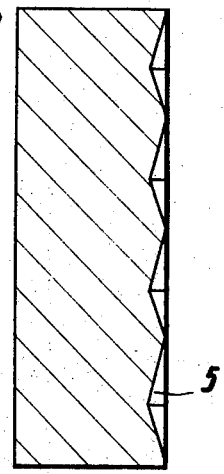
FIG. 9 is a cross-sectional view taken on line *i–j* of FIG. 8.
Figure 10:
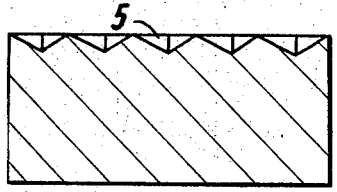
FIG. 10 is a cross-sectional view taken on line *k–l* of FIG. 8.
Figure 11:
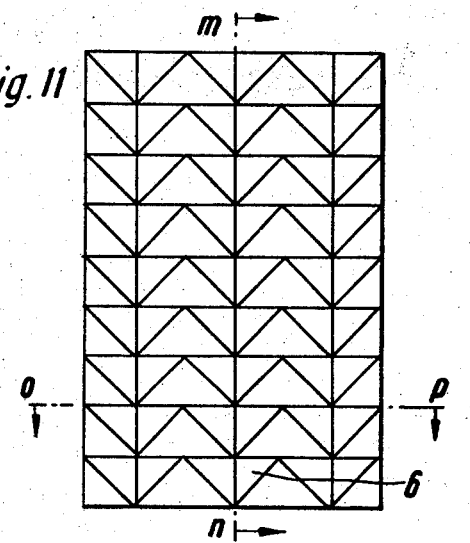
FIG. 11 is a top plan view showing a fourth embodiment.
Figure 12:
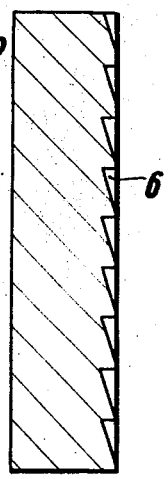
FIG. 12 is a cross-sectional view taken on line *m–n* in FIG. 11.
Figure 13:
FIG. 13 is a cross-sectional view taken on line *o–p* in FIG. 11.

In the embodiment shown in FIGS. 1 to 3, the bearing surface 1 is serrated and has pyramid-shaped depressions 2. The pyramids may be triangular, square or rectangular in cross-section. For example, the acute angles $\alpha$ and $\beta$ vary in dependence on the requirements or the properties of the plastics materials which may be employed so that different spacings of the profile elements may be selected. The depth $h$ of the profile may also be varied within certain limits. The depressions may alternatively have the shape of cones.

FIGS. 4 and 6 show a knurled surface having pyramid-shaped elements 3 and intervening correspondingly shaped depressions 4. This embodiment is an inversion of that shown in FIGS. 1 to 3 and has depressions of different shape. The remarks which have been made with reference to FIGS. 1 to 3 as to the variation of the cross-sectional shape of these pyramid-shaped elevations and of the acute angles $\alpha$ and $\beta$ are also applicable.

FIG. 7 shows the introduction of plastic material I into the depressions. The metallic portion of the bearing member II on the bearing surface may be selectively larger or smaller than zero. In the former case, as shown on the left side of FIG. 7, the pyramid-shaped elevations of the bearing member extend partly into and are exposed on the bearing surface. In the latter case, on the right side of FIG. 7, they are completely covered by a continuous layer of plastic material I. Thus theoretically the metallic portion may be equal to zero.

FIGS. 8 to 10, and 11 to 13 show other embodiments of knurled surfaces formed by the bearing material or bearing member. The plastic material is introduced into the depressions 5 and 6 formed in that surface. These shapes may also be modified accordingly.

Figure 14:
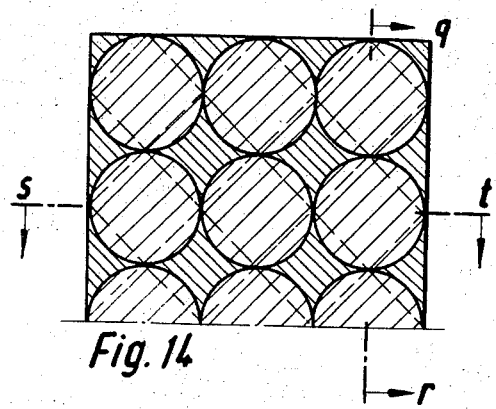
FIG. 14 is a cross-sectional view of a fifth embodiment taken on the line F—F in FIG. 16.
Figure 15:
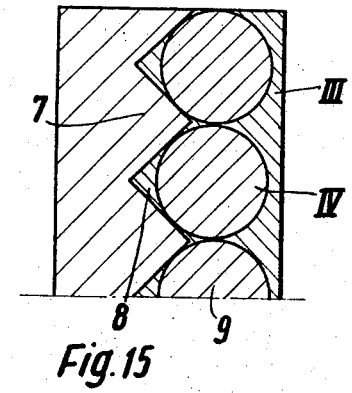
FIG. 15 is a cross-sectional view taken on line *q–r* in FIG. 14.
Figure 16:
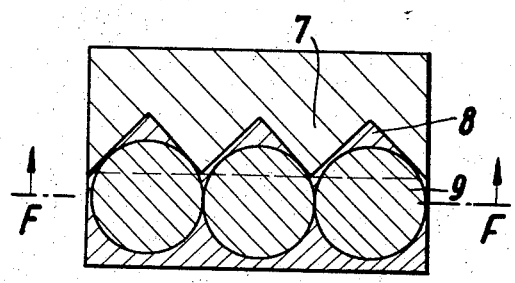
FIG. 16 is a cross-sectional view taken on line *s–t* in FIG. 14.

FIGS. 14 to 16 show another example of a surface formed with pyramids 7 and with depressions 8, which accommodate plastic material III as well as metal particles IV consisting here of balls 9.

Figure 17:
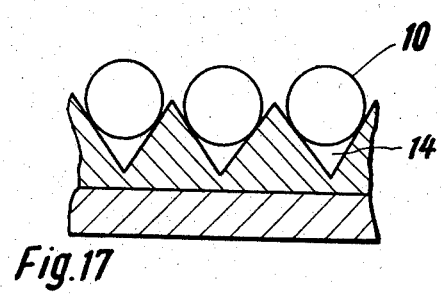
FIG. 17 is a cross-sectional view of a modification of FIGS. 14 to 16.
Figure 18:
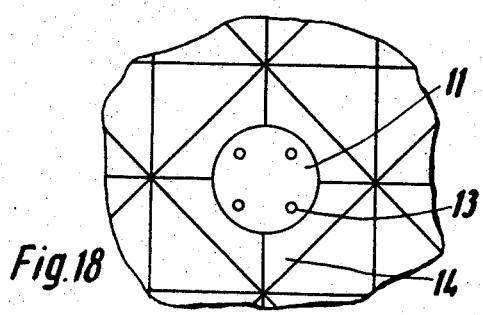
FIG. 18 is an enlarged top plan view of a portion of FIG. 17.
Figure 19:
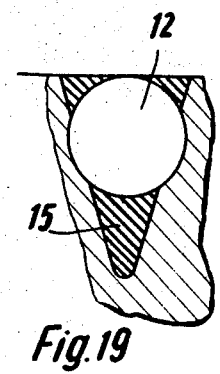
FIG. 19 is a cross-sectional view of a further modification of FIG. 17.

FIGS. 17, 18 and 19 show the use of balls 10, FIG. 17, balls 11, FIG. 18, and ball 12, FIG. 19, of different size, which balls contact the pyramid-shaped depressions 14 at four points 13, FIG. 18, so that the dissipation of heat is promoted. When the balls 12 are forced into the bearing material, as is shown in FIG. 19, a particularly good anchoring of the ball and of the plastic material which is introduced into the depressions 15 can be achieved.

Figure 20:
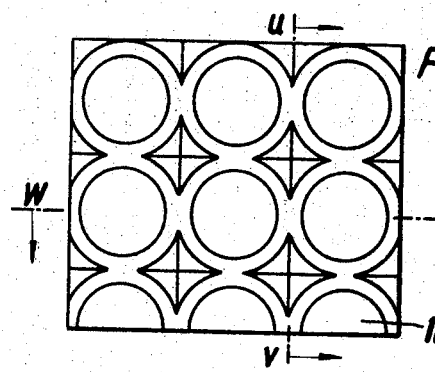
FIG. 20 is a top plan view showing a sixth embodiment.
Figure 21:
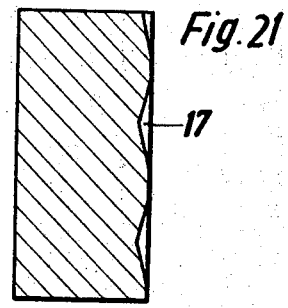
FIG. 21 is a cross-sectional view taken on line *u–v* in FIG. 20.
Figure 22:
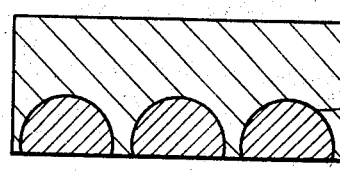
FIG. 22 is a cross-sectional view taken on line *w–x* in FIG. 20.
Figure 23:
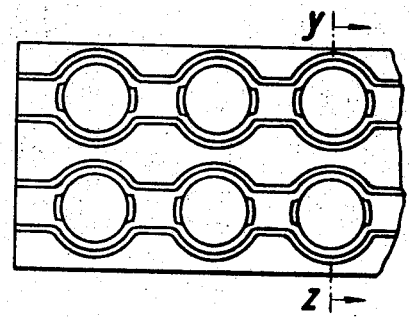
FIG. 23 is a top plan view showing a seventh embodiment.
Figure 24:
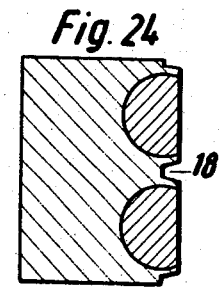
FIG. 24 is a cross-sectional view taken on line *y–z* of FIG. 23.

FIGS. 20 to 22, on the one hand, and FIGS. 23 and 24, on the other hand, illustrate two further embodiments which have spherical depressions 16. When the plastics material has been introduced, these depressions may be partly closed in a subsequent operation, which may be considered a calking operation and improves the anchoring of the plastics material. The resulting depressions 17, FIGS. 21, and 18, FIG. 24, may be filled with lubricant such as grease or oil so as to prolong the life of the bearing.

Figure 25:
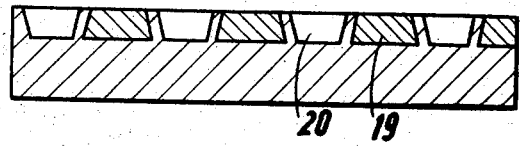
FIG. 25 is a cross-sectional view taken on line 25—25 in FIG. 26.
Figure 26:
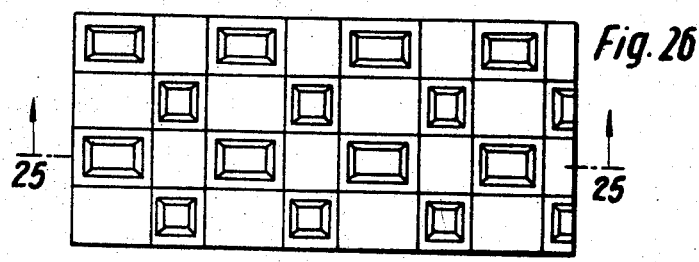
FIG. 26 is a top plan view showing an eighth embodiment.
Figure 27:
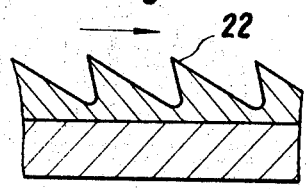
FIGS. 27 and 28 are cross-sectional views showing a bending of the sawtooth elements.
Figure 28:
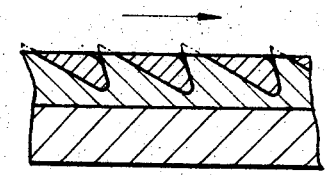
Figure 29:
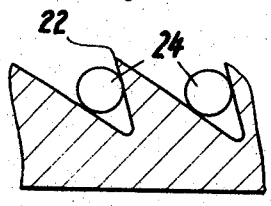
FIGS. 29 and 30 are cross-sectional views showing a deformation of the sawtooth elements and an inclusion of metal particles.
Figure 30:
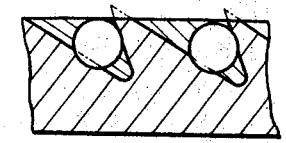

Finally, FIGS. 25 and 26, on the one hand, and FIGS. 27 to 30, on the other hand, show two additional embodiments having depressions 19 of conical or sawtooth shape. These depressions may also be partly closed by a subsequent operation so as to provide the depressions 20 of FIG. 25 or to bend over or deform the sawteeth 22 of the profile shown in FIGS. 27, 28 and 29, 30, respectively. FIGS. 29 and 30 show also the use of metal particles 24. These metal particles may be spherical as shown, or may have any other shape, e.g., an irregular shape.

The invention is described for example in the following embodiments.

EXAMPLE 1

The journal bearing has a sliding surface of aluminium, which is clad on a steel body and provided with rolled in pyramidal depressions. The depressions are completely filled with rolled on polytetrafluoroethylene, so that the whole sliding surface is covered with the plastic material.

EXAMPLE 2

The journal bearing has a sliding surface of an aluminium-alloy with 30% tin, 3% lead and 1% silicon, which is sintered on a steel body and provided with rolled in conical depressions. These depressions are partly filled with sprayed polytetrafluorobenzene, so that also 5% of the aluminium alloy form the sliding surface.

EXAMPLE 3

The journal bearing has a sliding surface of an aluminium alloy with 5% tin, 15% lead and 12% silicon, which is sintered on a steel body and provided with rolled in conical depressions. These depressions are partly filled with acetal incorporating 8% aluminium in form of balls, at which 20% of the metallic sliding surface are free of the plastic material.

EXAMPLE 4

The journal bearing has a sliding surface of aluminium which is sintered on a steel body and provided with rolled in sawtooth depressions. These depressions are partly filled with polyester incorporating 10% lead in form of balls, at which 40% of the metallic sliding surface are without polyester.

EXAMPLE 5

The journal bearing has a sliding surface of aluminium clad on a steel body and provided with rolled in spheric depressions, which are partly filled with polyamide incorporating 20% cadmium in form of balls, at which 65% of the metallic sliding surface are free of polyamide.

EXAMPLE 6

The journal bearing has a sliding surface of an aluminium clad on a steel body and provided with rolled in spheric depressions, which are partly filled with polyimide incorporating 35% aluminium in form of balls, at which 95% of the metallic sliding surface are free of polyimide.

EXAMPLE 7

The journal bearing has a sliding surface of an aluminium alloy with 12% tin, 9% lead and 6% silicon clad on a steel body and provided with rolled in conical depressions, which are partly filled with polyamid-11 incorporating 35% aluminium in form of balls, at which 95% of the metallic sliding surface are without polyamid-11.

EXAMPLE 8

The journal bearing has a sliding surface of aluminium clad on a steel body and provided with rolled in conical depressions, which are completely filled wtih polyamid-11 incorporating 3% thallium in form of balls, at which these depresisons are closed by the bended over apices between the depressions.

EXAMPLE 9

The journal bearing has a sliding surface of aluminium clad on a steel body and provided with rolled in conical depresisons, which are completely filled with polyamid-11 incorporating 10% indium in form of balls, which are forced into the metallic surface and mechanically anchored in the depressions.

EXAMPLE 10

The journal bearing has a sliding surface of aluminium clad on a steel body and provided with rolled in conical depressions, which are completely filled with polyamid-11 incorporating 25% aluminium-oxyd in form of balls, which are forced into the metallic surface and mechanically anchored in the depressions.

EXAMPLE 11

The journal bearing has a sliding surface of aluminum clad on a steel body and provided with rolled in conical depressions, which are completely filled with polyamid-11 incorporating 15% thallium with sulfur in form of balls, which are forced into the metallic surface and mechanically anchored in the depressions.

EXAMPLE 12

After degreasing and cleaning a steel strap with a breadth of 160 mm. and a thickness of 3.3 mm. it is roughened by a wire-brush on one side and then heated up to 600° C. under protective gas. After that the steel strap is fed together with an aluminum strap to a cladding mill, of which one roll has pyramidal shapings. In the opening between the rolls by a roll-pressure of 100 t. the aluminum strap is clad on the steel strap and simultaneously pyramidal depressions with a depth of 0.5 mm. are formed in the aluminum surface. In pursuance to that the pyramidal depressions are completely filled with rolled on polyamid-11 at a temperature of 230° C. by a further rolling operation the apices between the depressions are deformed so that they partly overlie the depressions and lock the polyamid-11 in the depressions.

EXAMPLE 13

After degreasing and cleaning a steel strap of a breadth of 160 mm. and a thickness of 3.3 mm. it is roughened by a wire-brush on one side and then heated up to 600° C. under protective gas. After that aluminum powder is sintered on the steel strap, which then is fed to a shape mill with conical shapings. In the opening between the rolls by a roll-pressure of 60 t. the aluminum surface is provided with conical depressions, which are completely filled with sprayed acetal.

By a further rolling operation the apices between the depressions are deformed, so that they partly overlie the depressions and lock the acetal in the depressions.

Having now described the means by which the objects of this invention are obtained.

We claim:

1. A journal bearing comprising a bearing surface carrying member having a metal surface composed of an alloy consisting of tin in an amount from 5 to 30% of the total weight of the alloy and lead in an amount from 3 to 15% of the total weight of the alloy, from 0 to 12% silicon, and the balance aluminum, depressions in said surface, and a plastic material selected from the group consisting of polytetrafluoroethylene, polytetrafluorobenzene, acetal, polyester, polyamides, and polyimides filling said depressions and forming the bearing surface.

2. A bearing as in claim 1, further comprising metal particles in said depressions.

3. A bearing as in claim 1, said plastic material containing one of the elements selected from the group consisting of aluminum, lead and cadmium in an amount of from 8 to 35% by volume.

4. A bearing as in claim 1, said plastic material containing one of the elements selected from the group consisting of thallium, indium and oxygen compounds of aluminum, tin, lead, indium, cadmium, and thallium with sulfur, selenium and tellurium in an amount from 3 to 25% by volume.

References Cited

UNITED STATES PATENTS

| | | | |
|---|---|---|---|
| 2,691,814 | 10/1954 | Tait | 308—238X |
| 2,865,692 | 12/1958 | Cossmann | 308—238 |
| 2,946,094 | 7/1960 | Kawaski | 308—M |
| 3,119,640 | 1/1964 | Laudig | 308—238X |
| 2,995,462 | 8/1951 | Mitchell | 308—M |
| 3,058,791 | 10/1962 | Stallman | 308—238 |
| 3,206,264 | 9/1965 | Dalzell | 308—M |
| 3,342,667 | 9/1967 | Berlinghof | 308—238X |
| 3,376,183 | 4/1968 | Flynn | 308—238 |
| 3,054,649 | 9/1962 | Arnold | 308 |
| 3,056,709 | 10/1962 | Rising | 308 |
| 3,167,366 | 1/1965 | Freund | 308—238 |
| 3,350,143 | 10/1967 | Lichowsky | 308—3 |
| 3,436,129 | 4/1969 | James | 308—3 |

FOREIGN PATENTS

| | | | |
|---|---|---|---|
| 1,060,501 | 4/1954 | France | 308—239 |

WESLEY S. RATLIFF, Jr., Primary Examiner